United States Patent
Lee et al.

(10) Patent No.: US 7,596,324 B2
(45) Date of Patent: *Sep. 29, 2009

(54) APPARATUS FOR EXTRACTING OPTICAL CLOCK USING FILTERS AND AMPLIFIER AND METHOD FOR THE SAME

(75) Inventors: Jae-Myoung Lee, Seoul (KR); Wang-Joo Lee, Daejon (KR); Je-Soo Ko, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 360 days.

This patent is subject to a terminal disclaimer.

(21) Appl. No.: 11/197,188

(22) Filed: Aug. 3, 2005

(65) Prior Publication Data

US 2006/0061402 A1    Mar. 23, 2006

(30) Foreign Application Priority Data

Sep. 22, 2004    (KR) ............... 10-2004-0075947

(51) Int. Cl.
*H04B 10/00*    (2006.01)
(52) U.S. Cl. .................... 398/155; 398/158
(58) Field of Classification Search ........ 398/155, 398/94, 158, 197
See application file for complete search history.

(56) References Cited

U.S. PATENT DOCUMENTS 3,761,716 A * 9/1973 Kapron et al. ............. 398/44
5,677,786 A * 10/1997 Meli ....................... 359/341.1
6,226,425 B1 * 5/2001 Chang-Hasnain et al. ..... 385/24
6,356,684 B1 * 3/2002 Patterson et al. ............ 385/37
7,162,162 B2 * 1/2007 Lee et al. .................. 398/155
2004/0067063 A1 * 4/2004 Lee et al. .................. 398/155

FOREIGN PATENT DOCUMENTS

| JP | 2001-016167 | 1/2001 |
| JP | 2003-110501 | 4/2003 |
| KR | 10-2004-0032264 | 4/2004 |

OTHER PUBLICATIONS

Bernd Franz, *Optical signal processing for very high speed (>40 Gbit/s) ETDM binary NRZ clock recovery* (Optical Fiber Communication Conference, pp. MG 1-1 MG 1-3, 2001).

* cited by examiner

*Primary Examiner*—Christina Y Leung
(74) *Attorney, Agent, or Firm*—Blakely, Sokoloff, Taylor & Zafman LLP

(57) ABSTRACT

The present invention relates to an apparatus and method for extracting an optical clock using filters and an amplifier. The object of the present invention is to provide an extraction of neighboring frequency components using wavelength fixed optical filters and an amplifier. In accordance with an aspect of the present invention, there is provided an apparatus for extracting an optical clock to extract a clock from the optical signal provided with plurality of peaks on a spectrum, including a first filter for extracting a central frequency component, a second filter for extracting a frequency component adjacent to the first frequency component, the amplifier for amplifying amplitude of the second frequency component until the amplitude of the second frequency component becomes the same as that of the first frequency component and the receiver for extracting a clock to do beating the first frequency component and the second frequency component.

7 Claims, 3 Drawing Sheets

APPARATUS FOR EXTRACTING OPTICAL CLOCK USING FILTERS AND AMPLIFIER AND METHOD FOR THE SAME

FIELD OF THE INVENTION

The present invention relates to an apparatus for extracting an optical clock in an optical communication system; and, more particularly, to an apparatus and a method for extracting an optical clock using wavelength fixed optical filters and an amplifier.

DESCRIPTION OF RELATED ART

In an optical communication system, a request for improving a transmission speed requires improvement of signal processing rate in a transmitter that converts data to an optical signal and in a receiver that recovers data from a transmitted signal. Particularly, a method for extracting an optical clock signal in the receiver for recovering the data from the transmitted signal has been studied as a plan for improvement of the transmission speed in the optical communication system.

A method using a self-pulsating phenomenon generated in a laser diode and a method using an optical loop mirror are researched to extract the optical clock. However, there is a difficulty in manufacturing elements to extract the desired optical clock, and there is a problem that the optical system is unstable.

To overcome these problems, a method for extracting the optical clock using a tunable filter is proposed. The method for extracting an optical clock using the tunable filter extracts two neighboring frequency components from a transmitted signal using one tunable filter, and recovers the desired optical clock using a beating process.

However, for the previous method of extracting the optical clock using the tunable filter, there is a range of amplitude difference to extract two neighboring frequency components for optical clock recovery, because of the characteristic of the tunable filter. And there is another problem that a performance of system can deteriorate because the tunable filter extracts not only two frequency components for optical clock recovery but other noise frequency components between the two frequency components.

SUMMARY OF THE INVENTION

It is, therefore, an object of the present invention to provide an apparatus and a method for extracting neighboring frequency components using wavelength fixed optical filters and an optical amplifier and for recovering the desired optical clock by beating the two extracted frequency components.

In accordance with an aspect of the present invention, there is provided an apparatus for extracting a clock from an optical signal provided with a plurality of peaks on a spectrum, which includes: a first filter for extracting a central frequency component with a highest amplitude on the spectrum of the optical signal; a second filter for extracting a frequency component adjacent to the central frequency component; an amplifier for amplifying amplitude of the frequency component; and a receiving unit for extracting a clock by beating the central frequency component and the amplified frequency component.

In accordance with another aspect of the present invention, there is provided an apparatus for extracting a clock from an optical signal provided with a plurality of peaks on a spectrum, which includes: a circulator for receiving the optical signal; a first filter for reflecting a central frequency component and for transmitting remaining signals; an amplifier for amplifying the transmitted signal from the first filter; a second filter for reflecting one of neighboring frequency component adjacent to the central frequency component to the amplifier; and a receiving unit for extracting the clock signal by beating the central frequency component and the amplified frequency component.

In accordance with another aspect of the present invention, there is provided a method for extracting an optical clock in an optical signal provided with a plurality of peaks on a spectrum, comprising the steps of: reflecting a first frequency component with the highest amplitude on the spectrum of the optical signal and transmitting the other frequency components; amplifying the transmitted optical signal; filtering a second frequency component adjacent to the first frequency component from the amplified optical signal; amplifying the second frequency component until the amplitude of the second frequency component becomes the same as the amplitude of the first frequency component; and obtaining a clock by beating the first frequency component and the second frequency component.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Figure 1:
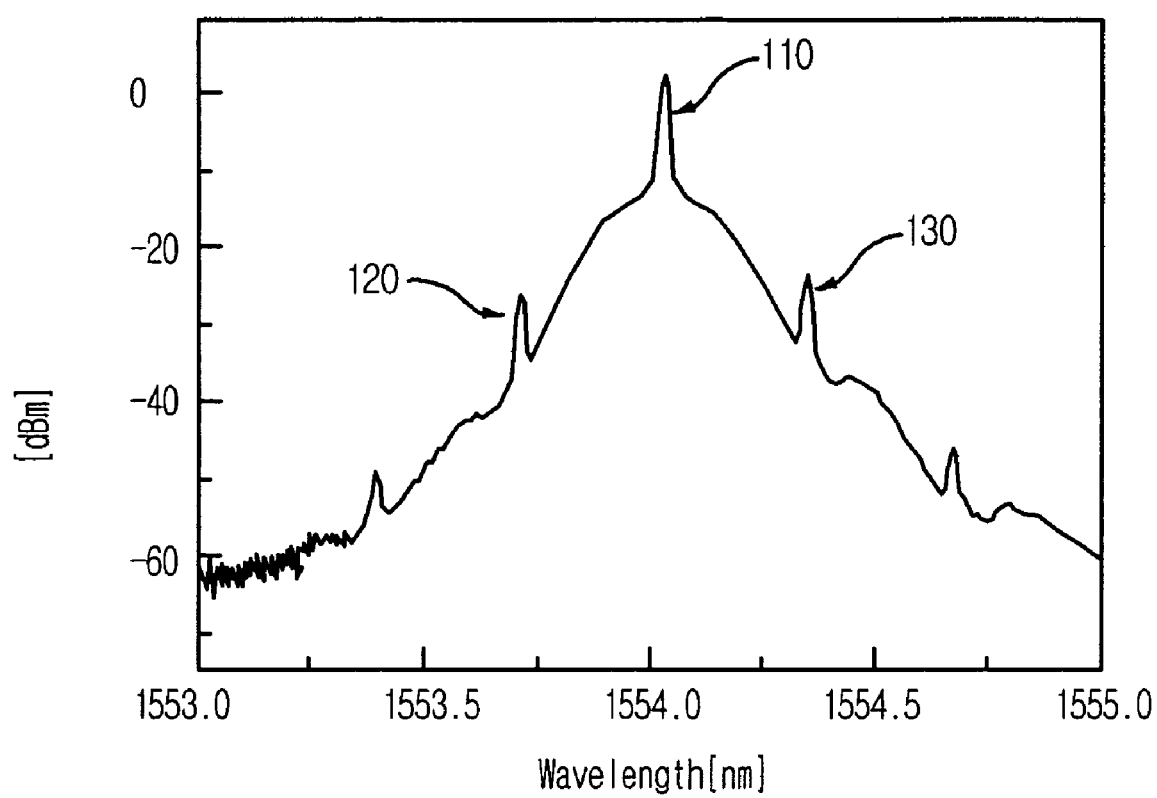
FIG. 1 is a graph depicting an optical spectrum of a transmitted signal modulated at a speed of 40 Gb/s.

FIG. 1 is a graph depicting optical spectrum of a transmitted signal modulated at a speed of 40 Gb/s.

The optical spectrum in FIG. 1 is a spectrum of transmitted NRZ (None Return to Zero) signal that is modulated at a speed of 40 Gb/s. As shown in FIG. 1, there are three peak frequency components on the spectrum of transmitted NRZ signal. At this point, the difference between a central frequency component 110 and one of two frequency components 120 and 130 existing on both sides of the central frequency component 110 is approximately 40 GHz (0.32 nm). This difference is the same as the clock frequency of received optical signal.

Using above-mentioned characteristic, extracting central frequency component 110 and one of two frequency components 120 and 130 adjacent to the central frequency component, and beating them, it is possible that clock signal of received signal is recovered.

Figure 2:
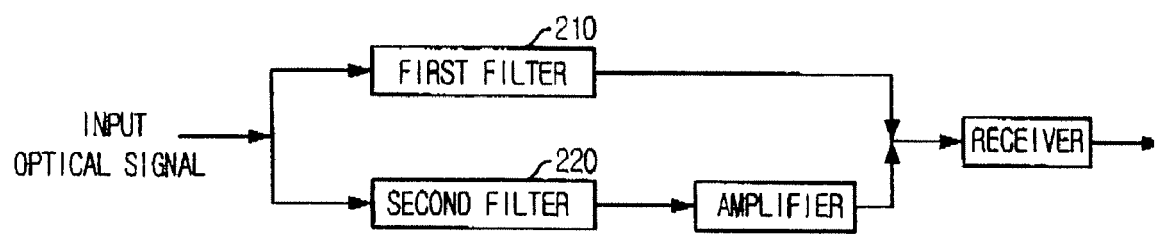
FIG. 2 is a block diagram of an apparatus for extracting an optical clock in accordance with a preferred embodiment of the present invention.

FIG. 2 is a block diagram of the apparatus for extracting an optical clock in accordance with a preferred embodiment of the present invention, for describing a process of recovering a clock signal with reference to FIG. 1.

As shown in FIG. 2, the apparatus for extracting an optical clock includes a first filter 210 for filtering the central frequency component 110 from an input optical signal, a second filter 220 for filtering a frequency component adjacent to the central frequency, an amplifier 230 for amplifying a signal filtered at the second filter 220 and a receiver 240 for recovering a clock component by beating the central frequency component and the amplified frequency component. A wavelength fixed transmission filter can be used for the first filter 210 and the second filter 220. And a photodiode can be used as the receiver 240.

After an optical signal having a spectrum of FIG. 1 is inputted, the first filter 210 filters the central frequency component 110 with the highest amplitude. And the second filter 220 filters one of two neighboring frequency components 120 and 130 adjacent to the central frequency component. The amplifier 230 amplifies the neighboring frequency component filtered from the second filter 220. The amplified frequency component becomes the same as the amplitude of the first frequency component filtered in the first filter 210. This is for beating two signals in the receiver 240, because beating phenomenon is not generated precisely if amplitudes of two signals are different. Therefore, the amplifier 230 makes amplitudes of two signals equal to each other by changing the amplification factor.

On the other hand, a desired clock signal is recovered in the receiver by beating the signal filtered at the first filter 210 and the signal filtered at the second filter 220 and amplified by the amplifier 230. That is, the clock signal having 40 GHz, i.e., a frequency difference between the central frequency component 110 and one of the neighboring frequency components 120 and 130 adjacent to the central frequency component, is recovered.

Figure 3:
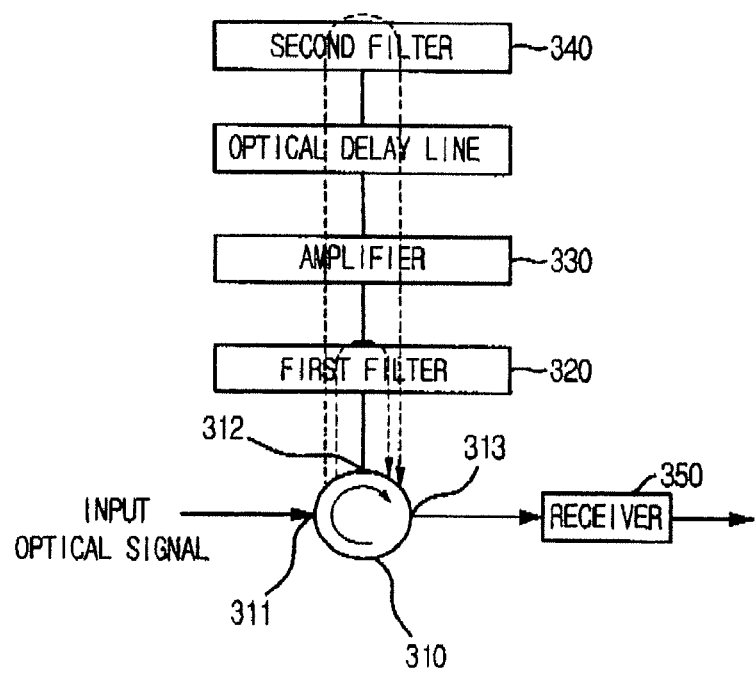
FIG. 3 is an another block diagram of an apparatus for extracting an optical clock in accordance with the preferred embodiment of the present invention.

FIG. 3 is another block diagram of the apparatus for extracting an optical clock. In FIG. 3, the two filters are connected by serial, different from the apparatus in FIG. 2, and the circulator is included.

The apparatus for extracting an optical clock in FIG. 3 includes a first filter 320, a second filter 340, an amplifier 330, a circulator 310 and a receiver 350. The circulator 310 is a device that changes the path of an optical signal. The circulator 310 includes a first port 311, a second port 312 and a third port 313. The signal that is inputted into the first port 311 is outputted to the second port 312, and the signal that is inputted in the second port 312 is outputted to the third port 313. The wavelength fixed reflection filter can be used as the first filter 320 and the second filter 340. The photodiode can be used for the receiver 350.

First, an optical signal that had inputted in the first port 312 is outputted to the first filter 320 through the circulator 310. The first filter 320 filters an optical signal inputted from the circulator 310, extracts the first frequency component and reflects the first frequency component.

At this time, the second frequency components adjacent to the first frequency component pass the first filter 320 and are inputted to the amplifier 330. And the neighboring frequency component is amplified in the amplifier 330, and is inputted to the second filter 340.

The second filter 340 filters one of second frequency components inputted from the amplifier 330, and reflects the second frequency component to the amplifier 330. Herein, the second frequency component filtered in the second filter 340 is determined according to the reflection frequency of the second filter 340.

The second frequency component is amplified again in the amplifier 330, and is outputted to the circulator 310. Accordingly, the amplification ratio of the second frequency component is squared to the amplification ratio of the amplifier 330.

Finally, the desired optical clock signal is recovered through beating the central frequency and the amplified frequency components in the receiver 350.

In the meantime, as above-mentioned, the beating phenomenon is not generated precisely if amplitudes of two signals are different when the receiver 350 does beating. Therefore, the apparatus for extracting an optical clock in FIG. 3 makes the amplitude of the second frequency component adjacent to the first frequency equal to the amplitude of the first frequency component through controlling amplification ratio of the amplifier 330.

And a distortion of signal can be generated because the progress distances of two signals are different. Accordingly, the optical delay line can be used between the first filter 320 and the second filter 340.

Figure 4:
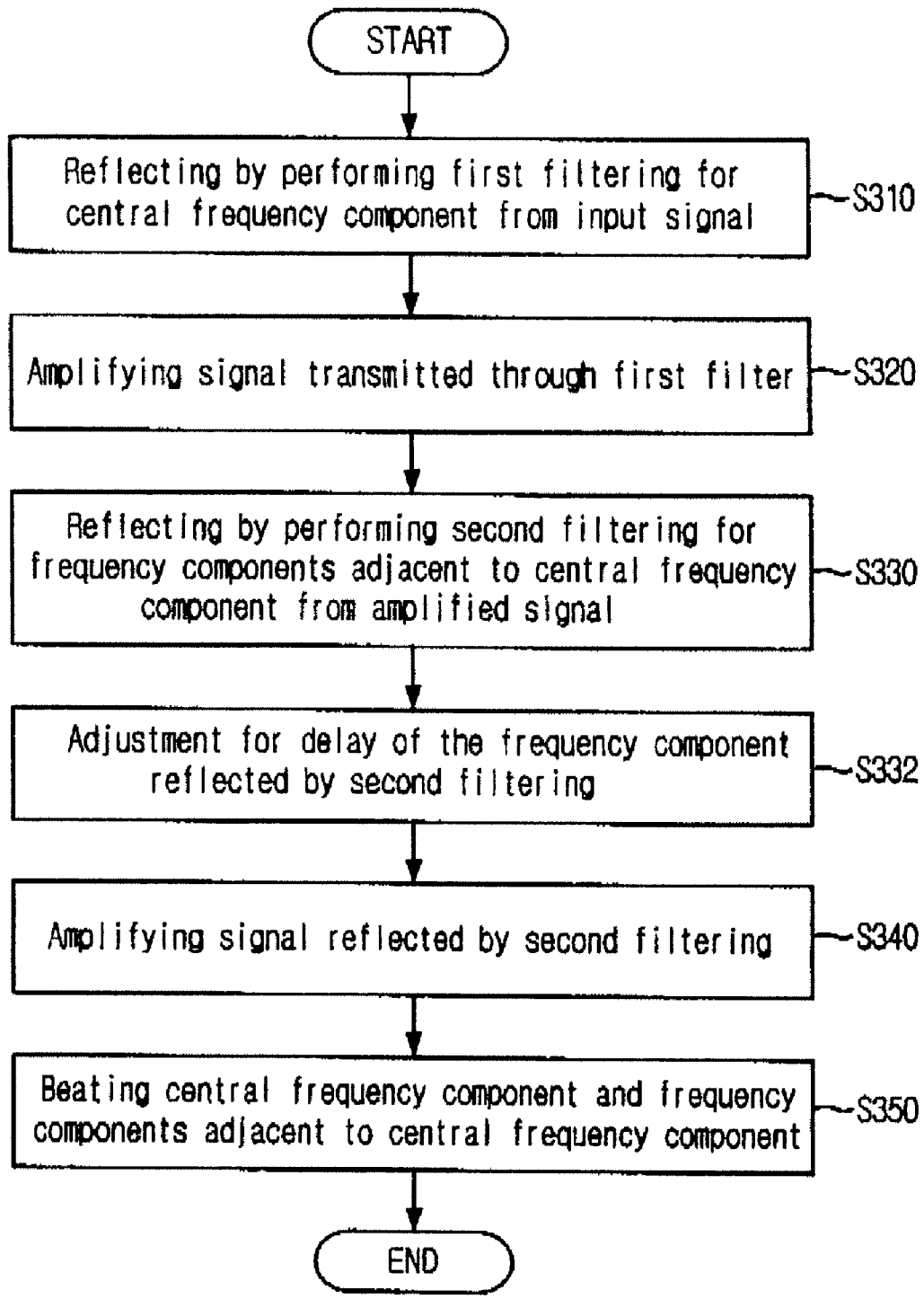
FIG. 4 is a flow chart of the method for extracting an optical clock in accordance with the preferred embodiment of the present invention.

FIG. 4 is a flow chart of the method for extracting an optical clock in accordance with the preferred embodiment of the present invention. As shown in FIG. 4, at step S310, a central frequency component is filtered from inputted optical signal in the first filter, and is reflected.

At step S320, the other frequency components that are not reflected in the first filter are amplified.

At step S330, a frequency component adjacent to the central frequency component is filtered from the amplified signal.

At step S340, a frequency component that is reflected in the second filter is amplified again.

At step S350, the receiver beats the amplified frequency component and the central frequency component and extracts an optical clock.

Above-mentioned apparatus in accordance with the preferred embodiment of the present invention can decrease the noise effects in an optical clock extraction. And the present invention can improve SNR (Signal to Noise Ratio).

Additionally, the present invention has no loss of an optical power because the present invention extracts an optical clock through amplifying the amplitude of the frequency component that has lower amplitude than amplitude of the central frequency component.

The present application contains subject matter related to Korean patent application No. 10-2004-0075947, filed with the Korean Intellectual Property Office on Sep. 22, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for extracting a clock signal from an optical signal provided with a plurality of peaks on a spectrum, comprising:

a first filter for extracting a central frequency component with a highest amplitude on the spectrum of the optical signal;

a second filter coupled in parallel with the first filter for extracting one of neighboring frequency components adjacent to the central frequency component;

an amplifier serially coupled to the second filter for amplifying amplitudes of the one of neighboring frequency components until the amplitude of the one of the neighboring frequency components becomes the same as the amplitude of the central frequency component; and a receiving unit that receives the central frequency component of the first filter and an output of the amplifier for extracting the clock signal by beating the central frequency component and the amplified frequency component.

2. The apparatus of claim 1, wherein the first filter and the second filter are wavelength fixed transmission filters.

3. An apparatus for extracting a clock from an optical signal provided with a plurality of peaks on a spectrum, comprising:
- a circulator for receiving the optical signal;
- a first filter for reflecting a central frequency component and for transmitting remaining signals;
- a bidirectional amplifier coupled to the first filter;
- a second filter for reflecting one of neighboring frequency components adjacent to the central frequency component to the bidirectional amplifier; and
- a receiving unit for extracting the clock signal by beating the central frequency component and the amplified frequency component,
- wherein the bidirectional amplifier amplifies the optical signal transmitted through the first filter and amplifies the neighboring frequency component reflected from the second filter.

4. The apparatus of claim 3, wherein the first filter and second filter are wavelength fixed reflection filters.

5. The apparatus of claim 3, further comprising:
- a delay unit for delaying the frequency component reflected from the second filter.

6. A method for extracting an optical clock in an optical signal provided with a plurality of peaks on a spectrum, comprising the steps of:
- a) reflecting a first frequency component with the largest amplitude on the spectrum of the optical signal and transmitting the other frequency components;
- b) amplifying, by a bidirectional amplifier, the other frequency components in the transmitted optical signal;
- c) reflecting a second frequency component adjacent to the first frequency component from the amplified optical signal;
- d) amplifying, by the bidirectional amplifier, the reflected second frequency component until the amplitude of the second frequency component becomes the same as the amplitude of the first frequency component; and
- e) obtaining a clock by beating the first frequency component and the second frequency component.

7. The method of claim 6, further comprising the step of: delaying the second frequency component reflected in the step c).

* * * * *